Nov. 10, 1953 　　　　J. R. THOMAS　　　　2,658,595
VARIABLE SPEED HYDRAULIC CLUTCH
Filed May 25, 1950　　　　　　　　　　　　　5 Sheets-Sheet 2
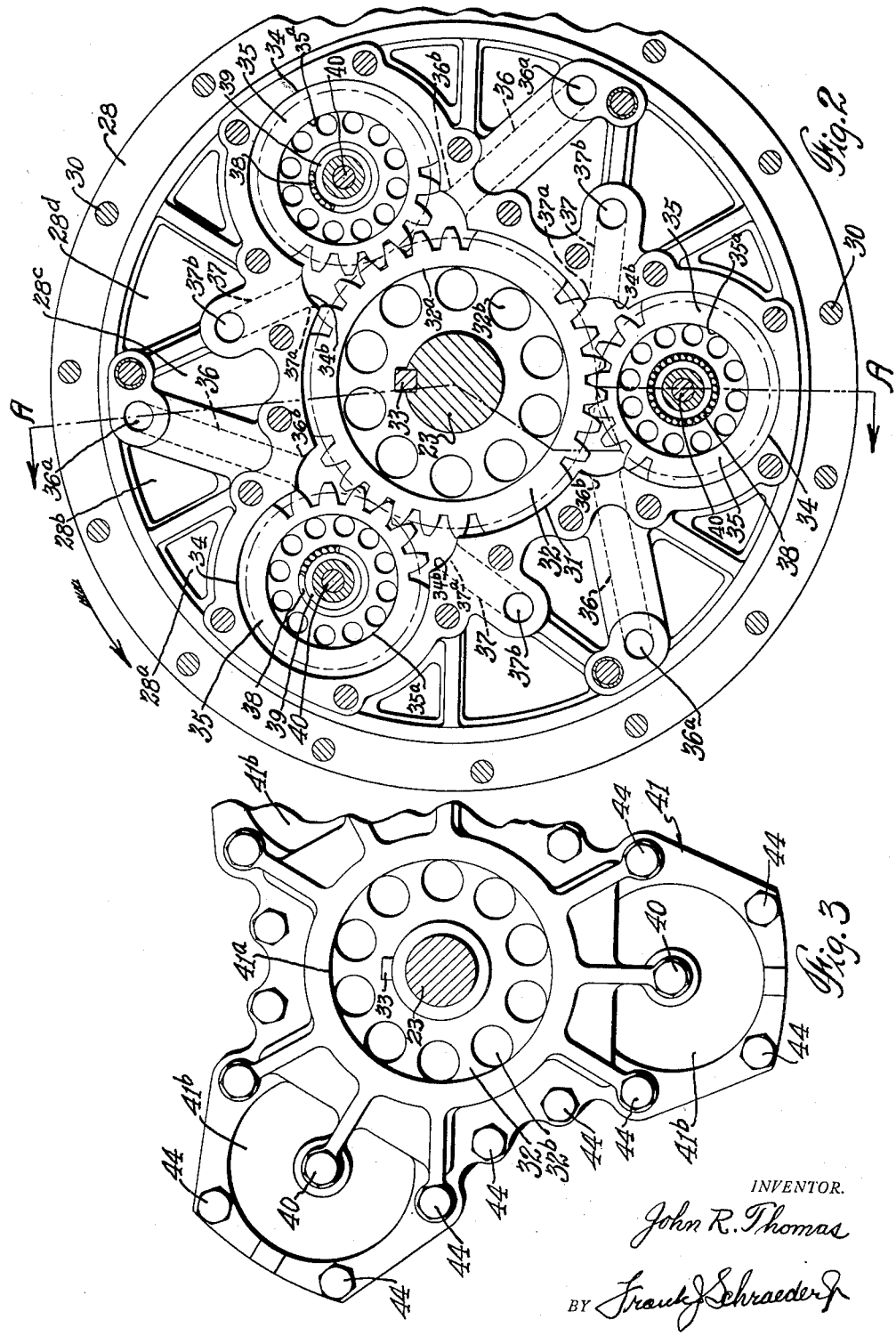
INVENTOR.
John R. Thomas
BY Frank J. Schraeder Jr.
ATTORNEY Nov. 10, 1953   J. R. THOMAS   2,658,595
VARIABLE SPEED HYDRAULIC CLUTCH
Filed May 25, 1950   5 Sheets-Sheet 3
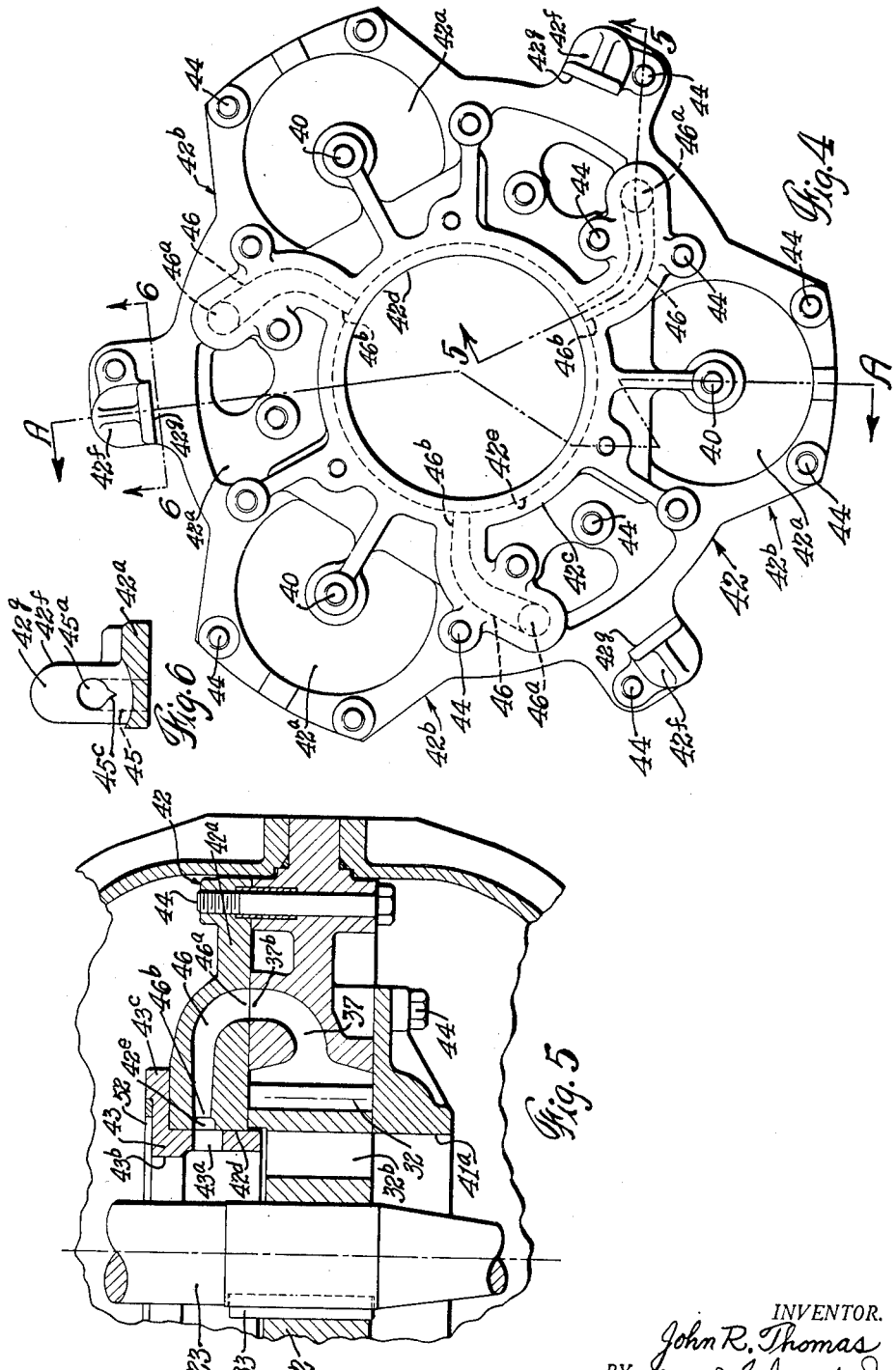
INVENTOR.
John R. Thomas
BY Frank J. Schraeder
Attorney Nov. 10, 1953         J. R. THOMAS         2,658,595
              VARIABLE SPEED HYDRAULIC CLUTCH
Filed May 25, 1950                       5 Sheets-Sheet 4

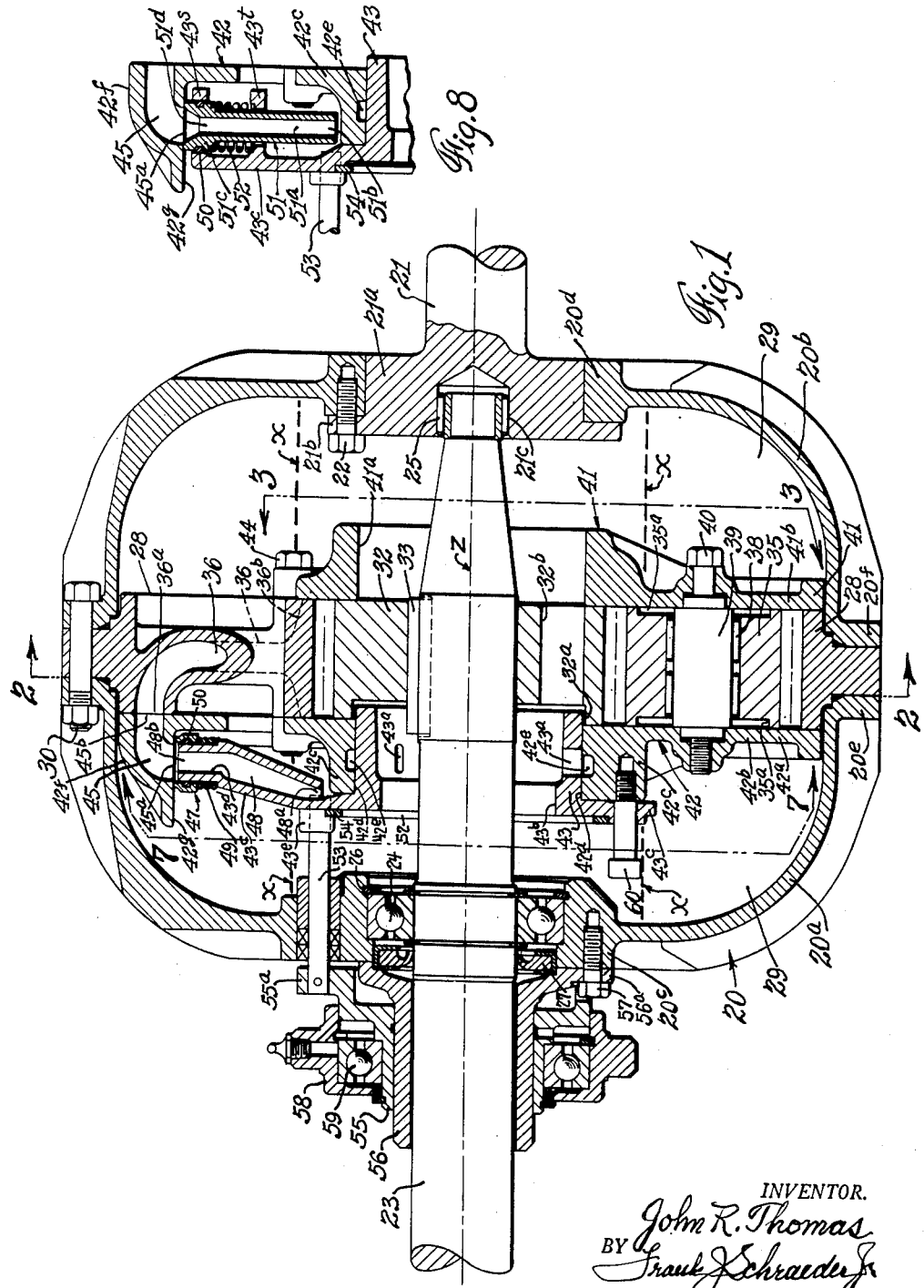

INVENTOR.
John R. Thomas
BY Frank Schraeder Jr.
Attorney

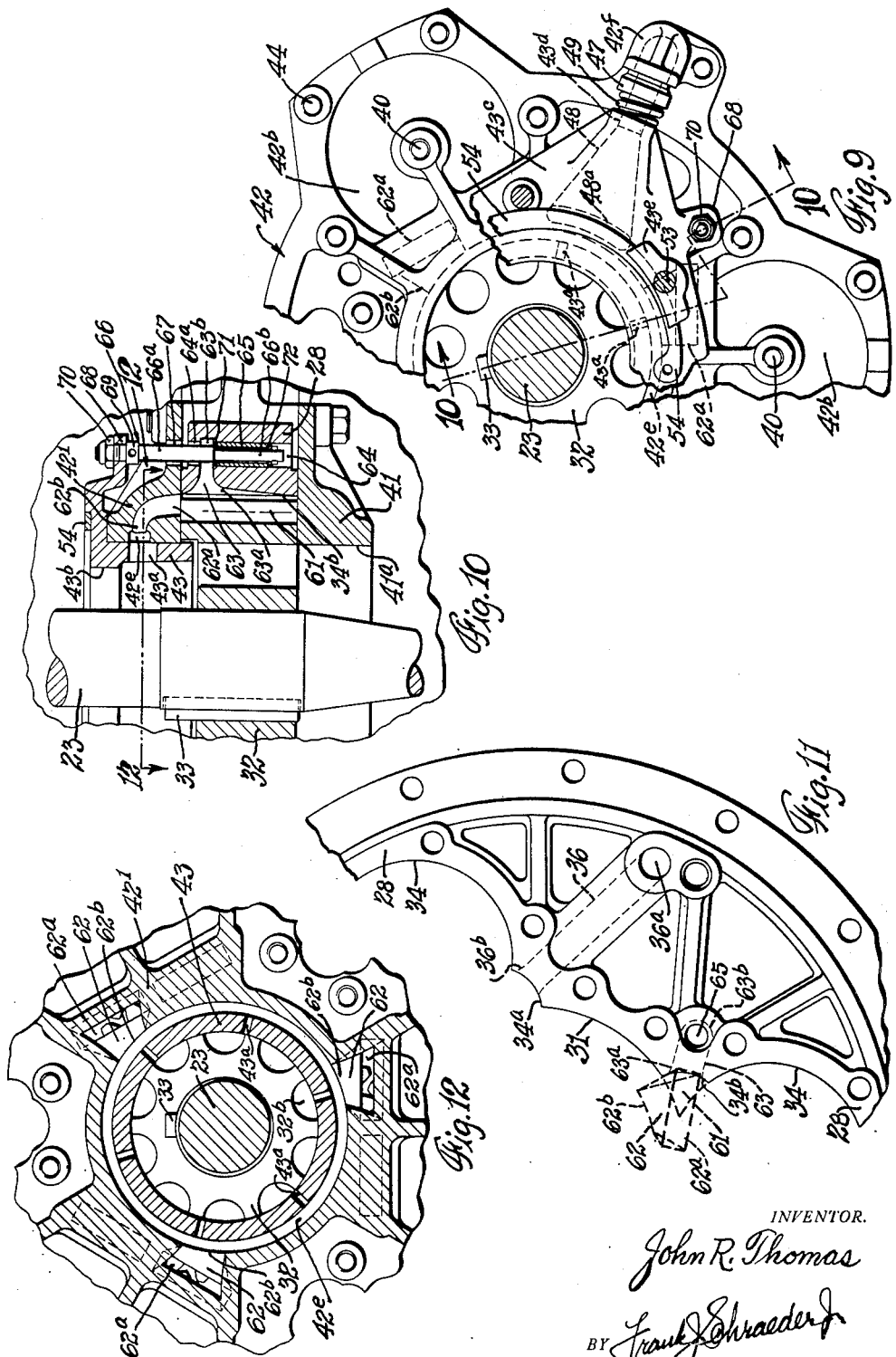

Patented Nov. 10, 1953

2,658,595

UNITED STATES PATENT OFFICE 2,658,595

VARIABLE SPEED HYDRAULIC CLUTCH

John R. Thomas, Wichita, Kans., assignor to Thomas Hydraulic Speed Controls, Inc., Wichita, Kans., a corporation of Kansas Application May 25, 1950, Serial No. 164,269

5 Claims. (Cl. 192—61)

This invention relates generally to improvements in variable speed hydraulic clutches or couplings adapted to be interposed between power-driven means and a driven shaft and wherein two fluids of different resistant value, such as for example air and oil, are employed independently as well as in mixtures of relatively varied proportions, and wherein the control of the flow of the independent fluids or of their mixtures is effected through an instrumentality constituting movable valve control means adapted for varying or metering and arresting the flow of the fluids through fluid-circulating power-transmitting pumping means such as, for example, a gear type pump having elements operatively connecting the power-driven means with the driven shaft for transmitting selectively variable speed and torque to the driven shaft.

The present invention has among its objects to provide certain novel improvements in the structure and arrangement of the fluid-circulating and power-transmitting means and control therefor which materially increase the efficiency of hydraulic clutches of the aforementioned type, afford the production thereof at comparatively reduced cost, and increase the scope of adaptation of same to a wider field of power transmission operations.

Among the objects of the invention is to provide in a variable speed hydraulic clutch adapted to be interposed between prime-mover-driven means and a driven shaft and comprising a rotatable casing partially filled with oil whereby, during the rotation of the casing, there is provided in the casing an outer annular zone of oil and an inner central zone of air, including within the casing power-transmitting fluid pumping means operatively connecting the casing with the driven shaft and having valve seats with inlet openings and also outlet openings communicating with respectively intake and discharge ports within the pumping means, a novel combined fluid intake and discharge control instrumentality within the casing, actuable exteriorly of the casing during its rotation for movement axially of the clutch, for controlling the flow of air and oil, through the intake and discharge ports of the pumping means, independently as well as in mixtures of relatively varied proportions; and including radially disposed air and oil intake control valves operable in the zone of oil, bodily movable axially of the clutch, normally urged with yielding pressure into constant contact with their seats, and centrifugally sealing responsively to centrifugal forces acting thereon during the rotation of the clutch; the centrifugal forces being utilized to the advantage of enhancing the sealing characteristic of the intake control valves in forcibly urging these valves outwardly into constant engagement with their seats with pressure progressively increased relatively and responsively to a progressively accelerated speed of the clutch casing during the axial movement of the valves thereby insuring against uncontrolled leakage of oil into the air stream even though the pressure of the oil annulus against the valves is also progressively increased by centrifugal force.

Still another object of the invention resides in the provision of a novel fluid intake and discharge control instrumentality for a variable speed transmitting hydraulic clutch, interposed between driving means and a driven shaft, which comprises a rotatable casing partially filled with oil whereby, during the rotation of the casing, there is provided in the casing an outer annular zone of oil and an inner central zone of air and including within the casing power-transmitting fluid pumping means operatively connecting the casing with the driven shaft and there being a manifold within the casing carried on the pumping means and having a plurality of valve seats containing fluid inlet openings and a plurality of fluid outlet openings communicating respectively with corresponding intake and discharge ports of the pumping means, the novel intake and discharge control instrumentality being movable axially of the clutch and comprising a fluid discharge control valve slidably carried on the pump manifold and disposed wholly within the central zone of air for controlling the flow of the fluids discharged from the pumping means and for entirely arresting fluid flow from the pumping means; the instrumentality also carrying a plurality of radially disposed air intake passages having inlet openings within the central zone of air and outlet openings spaced radially outwardly from the inlet openings and a combined air and oil intake control valve at the outlet opening of each air passage for controlling flow of air and mixtures of air and oil or of only oil through the valve seat inlet openings into the pumping means; the intake control valves being radially disposed, self-aligning, and bodily movable with the control instrumentality axially of the clutch while normally urged with applied yieldable pressure into constant contact with their seats and subjected to progressively increased pressure against their seats induced by centrifugal forces responsively to progressively accelerated rotation of the clutch; the control instrumentality being actuable exteriorly of the casing during its rotation for simultaneously moving the intake control valves and the discharge control valve for controlling the fluid flow through the intake and discharge ports of the pumping means.

A still further object of the invention is found in the provision of modified porting and auxiliary by-pass valves for enhancing the efficiency of hydraulic clutches of the type herein disclosed which are particularly adapted to be driven at comparatively high input speeds; the modified porting and auxiliary by-pass valves functioning to reduce to a minimum the drag torque transmitted to the clutch-driven shaft during neutral operation of the clutch by permitting oil, which might otherwise be trapped within the pump circuits by centrifugal force, to be freely discharged from the pump circuits through the by-pass valves which are normally open during clutch neutral operation; the by-pass valves being adapted to be moved to closed position simultaneously with the movement of the fluid-flow control instrumentality to thereby direct the flow of the pump-discharged fluid to and under the control of a single discharge control valve and whereupon continued axial movement of the control instrumentality increased speed and torque is imparted to the driven shaft.

The various features of novelty whereby the present invention is characterized will hereinafter be pointed out with particularity in the appended claims, however, for a full understanding of the invention and of its objects and advantages, reference may be had to the following detailed description taken in connection with the accompanying drawings exemplifying a preferred embodiment of the invention which is now considered to be the best mode of applying the novel principles of the invention.

The illustrations in the drawings, in which like reference characters designate like or corresponding parts, may be described as follows:

Fig. 1 illustrates a longitudinal section through a hydraulic clutch embodying my invention; the section being taken on line A—A shown in Figs. 2, 4 and 7;

Fig. 2 is a cross-section taken on line 2—2 of Fig. 1 showing an end view of the pump body together with the planet and sun gears;

Fig. 3 is a cross-section taken on line 3—3 of Fig. 1 showing an end elevation of the cover plate for one end of the pump body with one of the radial extensions broken away;

Fig. 4 shows an outside elevation of the pump manifold;

Fig. 5 is a cross-section taken on line 5—5 of Fig. 4 showing one of the discharge ports of the pump manifold and a corresponding portion of the pump body and one of its discharge ports communicating with the manifold discharge port together with a portion of the discharge control valve;

Fig. 6 is a cross-section taken on line 6—6 of Fig. 4 showing one of the air and oil inlet openings of the pump manifold valve seat;

Fig. 8 illustrates a vertical section of a modified form of one of the combined air and oil intake control valves;

Fig. 9 illustrates an elevation of a portion of the combined intake and discharge valve control instrumentality showing the operative connection between same and one of the three auxiliary valves employed in high speed clutches;

Fig. 10 is a cross-section taken on line 10—10 of Fig. 9 showing one of the auxiliary valves;

Fig. 11 illustrates an end view of a portion of the pump body showing one of the modified discharge ports in the pump body and a communicating discharge passage for one of the auxiliary valves; and Fig. 12 is a cross-section taken on line 12—12 of Fig. 10 showing the manifold discharge ports communicating the pressure-stabilizing port therein and the operatively associated discharge control valve.

Figure 7:
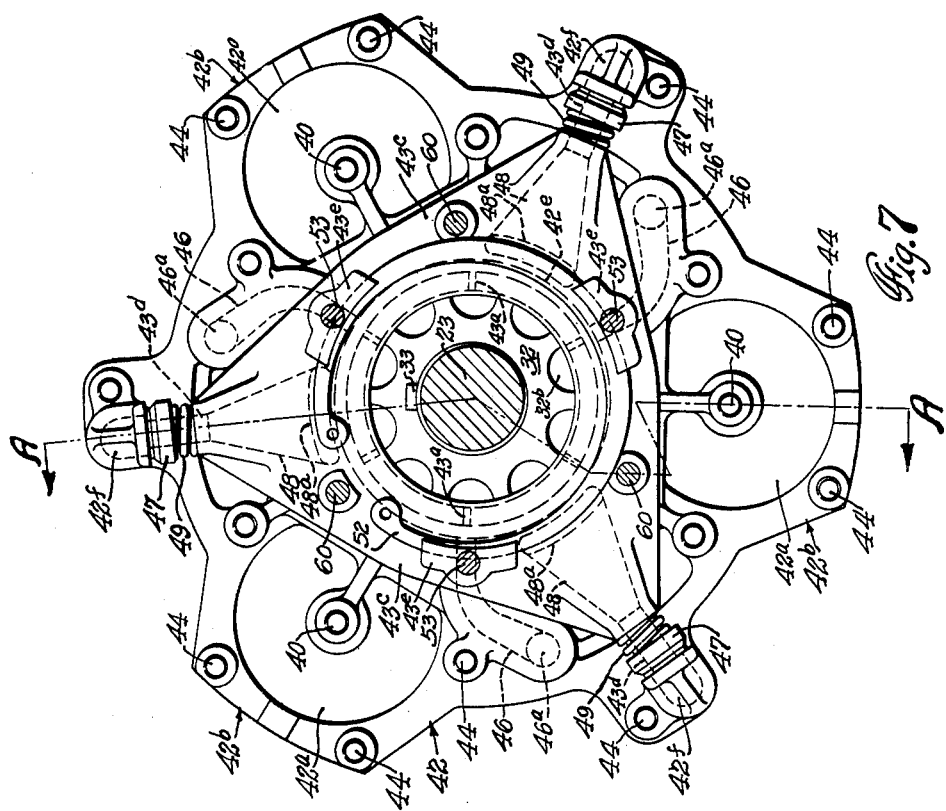
Fig. 7 is a cross-section taken on line 7—7 of Fig. 1 showing an end elevation of the combined intake and discharge valve control instrumentality.

In the preferred exemplification of my invention as illustrated in the accompanying drawings, the clutch casing 20 comprises a pair of cup-shaped sections 20$^a$ and 20$^b$ provided respectively with axially aligned cylindrical inner wall portions 20$^c$ and 20$^d$ and outer peripheral flanges 20$^e$ and 20$^f$.

The power-driven drive shaft 21 is provided with an enlarged head 21$^a$ which is supported within the cylindrical wall 20$^d$ and by means of its flange 21$^b$ and circularly spaced screws 22 is rigidly secured to the casing section 20$^b$.

The driven shaft 23 extends into the casing and is rotatably supported on a suitable ball-bearing 24 which is mounted within the cylindrical wall 20$^c$; the inner end 23$^a$ of the driven shaft 23 being rotatably supported on a suitable needle type bearing 25 carried within the cavity 21$^c$ of the drive shaft head 21$^a$.

The bearing 24 is removably retained within the cylindrical wall 20$^c$ by a suitable retainer ring 26 and a suitable oil seal 27 is mounted within the outer end of the wall 20$^c$.

The fluid-circulating power-transmitting means preferably comprises a planetary gear type pump consisting of a circularly shaped cast gear body 28 which is more clearly shown in Figs. 1 and 2.

To obtain a more dynamically balanced clutch and to provide a larger fluid chamber within the casing for more than adequate fluid supply and enhanced fluid circulation and cooling, the fluid-circulating and power-transmitting pump is preferably mounted axially centrally within the clutch casing as shown clearly in Fig. 1, however, the pump could be mounted within one end of the casing, as for example, by redesigning the casing section 20$^b$ to constitute an end closure wall extending over and adjacent to the right hand end of the pump body 28, as viewed in Fig. 1, and in such axially offset pump arrangement, for comparatively large horsepower clutches, slightly axially enlarging the capacity of the fluid chamber within the clutch casing section 20$^a$.

With the pump body 28 disposed centrally axially within the casing, the fluid chamber 29 extends transversely through the pump body 28 to within the opposite ends of the casing. The chamber 29 is partially filled with oil which, during the rotation of the casing, assumes annulus form to provide a central core of air which for illustration is defined by the broken lines designated by X in Fig. 1.

The peripheral flanges 20$^e$ and 20$^f$ of the casing sections 20$^a$ and 20$^b$ are regidly secured to the peripheral rim portion of the pump body 28 as by screws 30.

As more clearly shown in Figs. 1 and 2, the circular pump body 28 is provided with a central bore 31 containing a sun gear 32 which is secured, as by key 33, to the driven shaft 23. As shown in Fig. 2, the central bore 31 has three arcuate openings in its periphery which communicate with three circularly equally spaced bores or cavities 34 each containing a planet gear 35 which operatively mesh with the sun gear 32.

Assuming that the rotation of the clutch is anticlockwise as indicated by the arrow in Fig. 2, between each pair of planet gears 35, the pump body 28 is provided with a fluid intake port 36 and a fluid discharge port 37. The sun gear cavity 31 and the planet gear cavities 34 extend transversely through the opposed parallel end faces of the pump body 28. The corresponding end portions of the arcuate walls which define the planet gear cavities 34 are recessed, as at 36$^b$ and 34$^b$, to provide thereat enlarged cavities which communicate respectively with the inner ends of the intake ports 36 and discharge ports 37 whereat the intake and discharge ports are axially enlarged to extend substantially across the full thickness of the pump body as shown in Figs. 1 and 5.

In the present clutch, the series of inlet openings 36$^a$ for the intake ports 36 and the series of outlet openings 37$^b$ for the discharge ports 37 are located in a vertical plane coinciding with one end of the pump body 28. Each discharge port 37 is provided with an inlet opening 37$^a$ extending substantially across the full thickness of the pump body 28 similar in configuration to the outlet opening 36$^b$ of the intake port 36 shown in Fig. 1, however, the longitudinal length of each discharge port 37 is preferably shorter than the longitudinal length of each intake port 36 to thus shorten the paths of the discharged fluid from the pump to the pressure-stabilizing port 42$^e$ within the seat 42$^d$ for the discharge control valve 43.

The pump body 28 is provided with a plurality of transverse passages 28$^a$, 28$^b$, 28$^c$ and 28$^d$ to insure adequate cross-flow of fluid between the portions of the fluid chamber 29 disposed at opposite ends of the pump body 28.

Each rotatable planet gear 35 is provided with a suitable antifriction bearing 38 mounted about a tubular pin 39 which is securely held by a bolt 40 that extends longitudinally through the planet pin 39 and through the pump cover plate 41 into threaded connection with the manifold 42. The planet pins 39 have diametrically reduced ends for support within recesses in the pump end closure plate 41 and in the pump manifold 42 as shown in Fig. 1.

To reduce the drag torque transmitted to the driven shaft 23, the opposite ends of the planet gears 35 are slightly recessed as at 35$^a$. The sun gear 32 is also preferably recessed at one end, as at 32$^a$, for compact design purposes thereby providing additional space for axial movement of the fluid discharge control valve 43.

Additional transverse passages for fluid flow, between the portions of the fluid chamber 29 at the opposite ends of the pump body 28, are provided in the circularly spaced openings which extend axially through the sun gear and which passages are designated respectively by 32$^b$.

The pump cover plate 41 is provided with a comparatively large central opening 41$^a$ to insure adequate axial fluid flow transversely through the pump sun gear openings 32$^b$ and the three radial extensions 41$^b$ of the cover plate 41 constitute closures extending over the pump body cavities 34 for the planet gears 35. Bolts 44 together with the planet pin bolts 40 secure the cover plate 41 to the pump body 28 and to manifold 42.

The pump manifold 42 is shown in Figs. 1, 4, 5 and 7 in the form of a plate-like casting comprising a wall 42$^a$ having a plane-aligned inner face mounted in face contact with one end face of the pump body 28. Three circularly equally spaced radially disposed extensions 42$^b$ constitute closures extending over the pump body cavities 34 for the planet gears 35. The central hub-like portion 42$^c$ of the manifold is provided with a central opening 42$^d$ constituting a valve seat for the discharge control valve 43 and within the circular face of the valve seat 42$^d$ is an annular groove or recess constituting a pressure-stabilizing port 42$^e$.

The pump manifold 42 is also provided with a plurality of fluid intake extensions 42$^f$, cast preferably integrally with the wall 42$^a$, each containing an intake port 45.

Each fluid intake port 45 consists of a directionally right-angularly curved intake passage having an inlet opening 45$^a$ and an outlet opening 45$^b$ in registration with the inlet opening 36$^a$ of the pump intake port 36; the inlet openings 45$^a$ being disposed in preferably planar faces of the extensions 42$^f$ and the planar faces extending outwardly beyond the inlet openings 45$^a$, as at 42$^g$, to provide extended seats for air and oil intake control valves 47 of a combined intake and discharge control instrumentality hereinafter described. The inlet openings 45$^a$ are disposed entirely within the planar valve seats 42$^g$ which extend within planes disposed transversely to the longitudinal axes of the radially arranged corresponding tubular intake control valves 47 carried on the combined intake and discharge control instrumentality which is movable axially of the clutch; the plane of each valve seat being parallel to the bodily movement of its operatively associated intake control valve axially of the clutch, in other words, the planar valve seats extend in planes which are parallel to the movement of the outer peripheries of the intake control valves 47.

As shown in Fig. 6, each inlet opening 45$^a$ is not fully circular in shape but is preferably formed with a comparatively small V-shaped recess 45$^c$ to slightly enlarge the inlet opening diametrically on a radius line parallel with the longitudinal axis Z of the clutch driven shaft 23 and axially of the clutch on the inner side of the inlet opening at the point of the initial entrance of the oil through the V-shaped recess into the intake port 45 under centrifugal force in response to a comparatively slight outward movement of its operatively associated intake control valve 47 into operative position to uncover the recess to permit flow of oil therethrough into the manifold intake port 45.

The pump manifold 42 is also provided with a plurality of fluid discharge ports 46, as shown more clearly in Figs. 4 and 5, each having an inlet opening 46$^a$ in registration with a pump discharge port outlet opening 37$^b$ and each having an outlet opening 46$^b$ communicating with the pressure-stabilizing port 42$^e$.

The function of the V-shaped recesses 45$^c$ of the inlet openings 45$^a$ is to provide for a gradual admittance of oil into the air circuits to thereby gradually prime the pump and then, upon further outward movement of the intake control progressively accelerate the flow of oil into the intake ports while the inflow of air is progressively decreased until only oil is being admitted into the pump circuits.

As shown in Figs. 1, 5 and 7, I provide combined intake and discharge valve control instrumentality for controlling the circulation of air and oil, through the power-transmitting pumping means, independently as well as in mixtures of relatively varied proportions and such valve control instrumentality includes a hollow cylindrical fluid discharge control valve 43 slidably mounted on the manifold valve seat 42$^d$ and provided with a plurality of circularly spaced discharge openings 43$^a$ arranged to communicate with the pressure-stabilizing port 42$^e$. The air, mixtures of air and oil, or oil discharged from the pump through the pump discharge ports 37 and manifold discharge ports 46 into the pressure-stabilizing port 42$^e$ are subjected to progressively restricted flow through the discharge openings 43$^a$ and central opening 43$^b$ of the discharge control valve 43 into the fluid chamber 29; the size and shape and spacing of the discharge openings 43$^a$ may be varied to provide relatively different torque patterns versus valve movements.

At its outer end, the cylindrical portion of the discharge control valve 43 is formed integrally with a body 43$^c$ of generally triangular shape which preferably is cast, between the angular sides thereof, with a plurality of radially disposed circularly equally spaced air intake passages 48 extending from their inlet openings 48$^a$, within the inner circumference of the oil annulus or air zone, outwardly into the cylindrical tubular portions 43$^d$.

As shown in Figs. 1 and 7, the air inlet openings 48$^a$ are slightly arcuate and elongated in shape and the air intake passages 48 extending therefrom converge outwardly into cylindrical discharge ends within the radially disposed cylindrical portions 43$^d$ in which the air inlet passage 48 terminate in circular outlet openings 48$^b$; the faced surfaces of the ends of the cylindrical portions 43$^d$ terminate at adequate clearance distances from and in planes parallel to the planes of the seats 42$^g$ with which the air and oil intake control valves 47, loosely mounted on the portions 43$^d$, are maintained in constant engagement.

Although the tubular air and oil intake control valves 47, as illustrated in Fig. 1, are loosely mounted on the outer ends of the tubular portions 43$^d$ for self-aligning purposes, adequate means consisting of coil springs 49 are provided for normally yieldingly urging these valves into constant engagement with their seats 42$^g$ even when the clutch casing is in stationary position; the coil springs 49 being interposed between the inner ends of the valves 47 and shoulders formed on the outer sides of the tubular portions 43$^d$ of the air intake passages 48.

An O-ring seal 50 is interposed between each valve 47 and the cylindrical portions 43$^d$ to seal each valve 47 against oil seepage thereat.

The modified form of air and oil intake control valve shown in Fig. 8 combines the valve 47 and air intake passage 48 heretofore described into an independent and unitary element separately mounted on the body 43$^c$.

The combined unitary air and oil intake control valve shown in Fig. 8 is generally designated by numeral 51 and consists of a tubular air intake passage 51$^a$ having an air inlet opening 51$^b$ disposed within the air zone and is provided with an integral head constituting a tubular valve 51$^c$ which extends into the oil zone and is loosely mounted within a perforated ear 43$^s$ which is cast integrally with the body 43$^c$ coaxially with the air intake passage 51$^a$. An O-ring seal 50 is interposed between each valve 51$^c$ and the inner face of the perforation within the ear 43$^s$ to stabilize each intake control valve for co-movement with its supporting body 43$^c$ axially of the clutch casing.

The combined unitary air and oil intake control valves 51 are loosely mounted to be self-aligning on their valve seats 42$^g$ and are supported on coil springs 52; the outer end of each coil spring 52 being in abutment with the valve 51$^c$ and the inner end in abutment with a supporting ear 43$^t$ which is also cast integrally with the body 43$^c$.

The body 43$^c$ is cast with a plurality of lugs 43$^e$ which extend from the outer side thereof and are bored to receive therein the inner ends of a plurality of shifter rods 53; the lugs 43$^e$ being arcuately undercut to receive therein a snap ring 54 which also extends into corresponding radially aligned registering undercuts in the ends of the shifter rods 53 to thereby retain the shifter rods 53 in operative and secure engagement with the fluid intake and discharge control means.

The combined intake and discharge control instrumentality including the three oil intake control valves 47 (or the three intake control valves 51) and the single fluid discharge control valve 43, as shown in Figs. 1, 5, 7 and 8, functions as a unitary instrumentality to control the circulation of air and oil, through the power-transmitting pumping means, independently as well as in mixtures of relatively varied proportions and includes operating means consisting of a cylindrical shifter sleeve 55 which is slidably mounted on a cylindrical carrier sleeve 56 and provided with a plurality of integral ears 55$^a$ within which the outer ends of the shifter rods 53 are suitably secured for axial movement with the shifter sleeve 55.

The carrier sleeve 56 is provided with a flange, on its inner end, having a plurality of ears 56$^a$ for screws 57 which secure the carrier sleeve 56 to the cylindrical wall 20$^c$ of the casing section 20$^a$ for rotation therewith; the driven shaft 23 being rotatable within and relatively to the carrier sleeve 56.

The shifter sleeve 55 and shifter rods 53 are rotatable with the clutch casing but are axially shiftable on the carrier sleeve 56 by means of a shifter collar 58 mounted on a ball-bearing 59 the outer race of which is secured to the collar 58 and the inner race to the shifter sleeve 55. A well known shifter fork (not shown) may readily simultaneously shift the collar 58 and sleeve 55 to transmit axial movements to the shifter rods 53 to thereby actuate the combined fluid intake and discharge control instrumentality during the rotation of the clutch casing by the drive shaft 21 whereby through such axial movement of the fluid flow control instrumentality variable speeds are imparted to the driven shaft 23.

Three screws 60 secured in the hub-like portion 42$^c$ extend through openings in the marginal portions of the body 43$^c$ and constitute additional guiding means for the control instrumentality. The screws 60 also function as means for preventing rotation of the control instrumentality relatively to the manifold 42 and also as stop means for limiting the outward movement of the control instrumentality.

Without giving consideration to the metering control of the fluids by the concurrent action of the valves 47 and 43, the fluid flow circuit may best be described as follows:

Assuming that the direction of rotation of the clutch casing is anti-clockwise as viewed in Fig. 2, all fluids, such as air, or mixtures of air and oil, or oil admitted into the manifold intake ports 45, under the control of the axially shiftable intake control valves 47 (or valves 51) pass into the pump intake ports 36, circulate through the pump gear system and are discharged through the pump discharge ports 37 into the pressure-stabilizing port 42e from which their discharge into casing chamber 29 is under the control of the single discharge control valve 43.

As shown in Figs. 1 and 8, the combined intake and discharge valve control instrumentality, including the air intake passages 48 and their operatively associated air and oil intake control valves 47 (or valves 51) together with the single discharge control valve 43, is shown in neutral position wherein only air, from the central air zone, is admitted into the fluid-circulating power-transmitting pump as the intake control valves seal the intake ports 45 against entrance of oil thereinto by applied pressure and centrifugal forces which retain the intake control valves in constant engagement with their seats 42g thus preventing the oil from by-passing the valves into the ports 45; the air admitted into the radial air intake passages, through their inlet openings within the air zone, is discharged through their outlet openings into the manifold intake ports 45 which are in constant communication with the pump intake ports 36 to receive therein the flow of the in-coming air for circulation through the pump gear system and discharge therefrom through the pump discharge ports 37 into the pressure-stabilizing port 42e and therefrom through the discharge valve openings 43a into the central zone of air. Under such neutral operation the driven shaft 23, for all practical operative purposes, is inoperative to transmit power as the circulated air is an insufficient resistant in the gear system to transmit operative power to any machine with which the driven shaft 23 is coupled.

Progressively increased torque and speed are transmitted to the driven shaft 23 when the combined intake and discharge valve control instrumentality is progressively axially moved from neutral position, toward the left as viewed in Fig. 1, by operating means including the shifter 58 and the shifter rods 53 which connect the shifter with the valve control instrumentality.

As the combined intake and discharge control instrumentality is progressively moved toward the left, the discharge openings of the radial air intake passages will be moved relatively out of alignment with the valve seat intake openings 45a to thereby progressively decrease the flow of air into the intake ports 45 while simultaneously the valves 47 (or valves 51) will be moved to progressively uncover the valve seat intake openings 45a to thereby permit a progressively increased flow of oil into the intake ports 45 for admixture with the progressively decreased flow of air until the volumetric flow of oil supplants the flow of air as the valves 47 (or valves 51) approach and engage the outer solid portions of their seats 42g whereat the flow of air will be supplanted by flow of oil by-passed around the valves 47 (or valves 51) into the exposed inlet openings 45a of the intake ports 45.

During the progressive movement of the intake and discharge control instrumentality described in the preceding paragraph, the discharge control valve 43 is simultaneously moved to progressively shift its discharge openings 43a relatively to the pressure-stabilizing port 42e to thereby progressively restrict discharge of the fluids into the central zone of air within the casing chamber 29 until the discharge openings 43a have been shifted completely out of registration with the pressure-stabilizing port 42e whereupon the discharge of the oil from the power-transmitting pump will be completely arrested and a substantially positive drive coupling attained.

The invention also contemplates improvements in modified porting including auxiliary by-pass valves 65, supplementary to those hereinabove described, for enhancing the efficiency of hydraulic clutches of the type herein disclosed which are particularly adapted to be driven at comparatively high input speeds; the by-pass valves 65 functioning to improve the efficiency of such high speed clutches by reducing to a minimum the drag torque transmitted to the clutch-driven shaft during neutral operation of the clutch by permitting oil which might otherwise be trapped within the pump circuits by centrifugal force to be freely discharged from the pump circuits. The modified porting and by-pass valves are illustrated in Figs. 9 to 12 inclusive and are particularly useful in high speed hydraulic clutches wherein the design has space limitations in areas surrounding the discharge control valve and more particularly wherein the discharge control valve is of comparatively small diameter and positioned wholly within a central air zone of the clutch casing and also wherein the discharge porting is of such character that the oil passing therethrough is subjected to centrifugal forces which in certain pump porting designs tend to trap portions of the oil within pump ports or cavities having outlets through which the discharge of the oil is resisted by centrifugal forces.

As hereinabove described, the pump body 28 shown in Fig. 2 is provided with three fluid discharge ports 37 which receive fluid from the discharge sides of the fluid circuits terminating within the triangular-like cavities defined by the peripheries of the sun and planet gears and the arcuate wall 34b. These discharge cavities are designated by numeral 61 in Figs. 10 and 11 and are shown as defined by arcuate extensions of the walls 31 and 34 and the arcuate wall 34b.

In clutches driven at variable speeds and particularly at high speeds, I prefer to eliminate the pump body discharge ports 37 shown in Fig. 2 and substitute therefor the three discharge cavities 61 which constitute the pump discharge ports. The comparatively short discharge ports 62 within the manifold 42¹ are provided with inlet openings 62a which communicate with the open ends of the discharge ports 61. The open ends of the ports 61 are located in the end of the pump body adjacent to the manifold 42¹; the opposite ends of the discharge ports 61 are closed by the cover plate 41.

The manifold discharge ports 62 are curved toward their discharge ends and converge from their inlet openings 62a toward their outlet openings 62b which communicate with the annular pressure-stabilizing port 42e within the manifold seat 42d provided for the discharge control valve 43, as more clearly shown in Figs. 10 and 12; the position of the inlet openings 62a relatively to the pump discharge ports 61 being illustrated diagrammatically in Fig. 11.

The modified porting also includes three by-pass ports 63 formed within the pump body 28 one of which is shown in Figs. 10 and 11; each by-pass port 63 having an inlet opening 63ª, substantially rectangular and of a length equal to the full width of the pump body 28, communicating with one of the three ports 61 and each by-pass port 63 converging into a restricted outlet portion terminating in a semi-circularly walled outlet opening 63ᵇ which is coaxial with a cylindrical bore or valve seat 64 in which is slidably mounted a tubular cylindrical by-pass valve 65 mounted on a valve stem 66 for controlling fluid discharge from the outlet opening 63ᵇ as shown in Figs. 10 and 11.

The outlet opening 63ᵇ is located intermediate the opposite ends of the bore or cylindrical valve seat 64, which extends transversely through the opposite ends of the pump body, and the radius of the end wall of the outlet opening 63ᵇ is greater than the radius of the cylindrical bore or valve seat 64.

Each tubular by-pass control valve 65 is mounted coaxially with and on a diametrically reduced inner end portion 66ᵇ of the diametrically enlarged valve stem portion 66ª which extends outwardly through the cylindrical valve seat discharge opening 64ª, through a manifold opening 67, and through an ear 68 cast integrally with the main fluid discharge control valve 43; the stem portion 66ª being secured to the ear 68 for concurrent movement with the discharge control valve 43 by means of a collar 69 and lock nut 70.

The sleeve-like by-pass valve 65 is secured to the valve stem portion 66ᵇ by a washer 71 interposed between the inner end of the stem portion 66ª and one end of the by-pass valve 65 and a second washer 72 secured to the inner end of the stem portion 66ᵇ adjacent to the opposite end of the valve 65.

The by-pass valves 65 are loosely held on the stem portion 66ᵇ and thus are self-aligning and are of thin-section material to minimize the effect of centrifugal forces acting thereon.

The transverse widths of the outlet openings 63ᵇ, axially of the valves 65, are such that during clutch neutral operation, when the by-pass valves 65 are in the position shown in Fig. 10, the by-pass ports 63 are fully open to freely discharge air or any trapped oil from the gear cavities or discharge ports 61 through the by-pass outlet openings 63ᵇ and around the valve stem portions 66ª through the open valve seat discharge openings 64ª into the fluid chamber 29.

In the operation of high speed clutches employing the combined intake and discharge control instrumentality shown in Fig. 1 together with the modified porting 62 and 63 and by-pass valves 65 illustrated in Figs. 9 to 12 inclusive, the positions of the control elements, as shown in Figs. 1, and 9 to 12 inclusive, are those which these elements occupy during clutch neutral operation.

To impart progressively increased speed and torque to the driven shaft 23, after the pump circuits had been cleared during neutral operation of any accumulated bodies of oil possibly trapped in the pump porting, the combined intake and discharge control instrumentality is progressively shifted axially outwardly as hereinabove described to thereby impart simultaneous movement to the air and oil intake control valves together with the discharge control valve 43 and the by-pass control valves 65. During an initial portion of such outward valve movement, the by-pass control valves 65 will move outwardly to positions wherein they have traversed and closed the by-pass outlet openings 63ᵇ and simultaneously during such initial movement, the air and oil intake control valves will have been concurrently slidably shifted on their seats 42ᵍ to positions whereat their peripheral edges have uncovered the V-shaped recesses 45ᶜ of inlet openings 45ª to permit a restricted flow of oil into the pump intake ports for admixture with the inflow of air; the restricted inflow of oil being sufficient to prime the pump circuits to create adequate suction for efficient operation of the pump during the progressively increased volumetric flow of oil thereinto as the combined intake and discharge control instrumentality is moved further axially outwardly to thereby transmit a progressively increased speed and torque to the driven shaft 23 by supplanting the flow of air with the flow of oil and progressively restricting discharge of the oil by the concurrent axially outward movement of the discharge control valve 43 until the driven shaft 23 is rotating at its maximum speed when the discharge control valve 43 has moved to its outermost position whereat its discharge openings 43ª have moved out of registration with the pressure-stabilizing port 42ᵉ to thereby arrest all flow of oil from the pump circuits.

I claim:

1. In a clutch of the character described including a revoluble pump and in which, during rotation of the pump, there is a zone of oil and a zone of air: the improvement which comprises elements spaced around the axis of rotation of the pump and projecting from one end and near the periphery of the pump, each such element having a valve seat parallel to and facing said axis and containing an inlet for fluids; an axially slidable member mounted adjacent said end of the pump; and radial, open-ended tubular, combined air and oil flow control devices on said member, each with its inner end disposed within the zone of air and its outer end engaging one of said seats to cover and uncover the inlet in that seat, depending on the position of said member along said axis, at least a part of each combined air and oil flow control device being movable radially and urged by a spring against its corresponding seat.

2. In a clutch of the character described including a revoluble pump and in which, during rotation of the pump, there is a zone of oil and a zone of air: the improvement which comprises elements spaced around the axis of rotation of the pump and projecting from one end and near the periphery of the pump, each such element having a valve seat parallel to and facing said axis and containing an inlet for fluids; an axially slidable member mounted adjacent said end of the pump; radial, open-ended tubular combined air and oil flow control devices bodily slidable in the radial direction on said member, each with its inner end disposed within the zone of air and its outer end engaging one of said seats to cover and uncover the inlet in that seat, depending on the position of said member along said axis, and a coaxial spring for each of said devices urging said devices into engagement with their corresponding valve seats.

3. In a clutch of the character described including a revoluble pump and in which, during the rotation of the pump, there is maintained an outer annular zone of oil and an inner central zone of air: the improvement which comprises elements spaced around the axis of rotation and near the periphery of the pump within said zone of oil, each such element having a valve seat parallel to and facing said axis and containing an inlet for fluids; a central, axially slidable member mounted on one end of the pump, said member having radial, open-ended air passages each with its inner end in the zone of air and its outer end close to one of said seats and adapted to register with the inlet in that seat in one position of the said member along said axis, said member having thereon radially movable tubular valves axially aligned with the upper ends of said radial air passages and fitting snugly against the seats to close the inlets in the latter against the entrance of oil when the radial passages register with such inlets, while allowing oil or oil and air in relatively varying proportions to enter the inlets, depending on the position of said member along said axis; and means on said member yieldingly pressing said valves against said seats.

4. In a clutch of the character described including a revoluble pump and in which, during rotation of the pump, there is maintained an outer annular zone of oil and an inner central zone of air: the improvement which comprises elements spaced around the axis of rotation of the pump and projecting from one end and near the periphery of the pump, each such element having a valve seat parallel to and facing said axis and containing an inlet for fluids; an axially slidable member mounted adjacent said end of the pump; radial, open-ended tubular, combined air and oil intake control valve devices on said member, each having an inner tubular end portion extending into the zone of air and its outer tubular end engaging one of said seats adapted to cover and uncover the inlet in that seat depending on the position of said member along said axis; said pump having discharge outlets to discharge fluids through said pump end; valve means on said slidable member to open said discharge outlets when said tubular, combined air and oil flow control devices are moved into inlet covering positions, and to close the discharge outlets when said flow control devices are moved into inlet uncovering positions; and an auxiliary fluid by-pass passage leading from each outlet passage in the pump to the exterior of the pump, a by-pass valve for each by-pass passage to open and close the by-pass passage, and means connecting said by-pass valves with said member to cause said by-pass valves to open whenever said member is in a position along said axis to arrest the entry of oil and admit only air into said valve seat inlets.

5. A combined fluid intake and discharge control instrumentality, for a power-driven hydraulic clutch of the kind described, comprising a rotatable axially movable member, a plurality of radially movable air and oil intake control valves on said member disposed within the zone of oil, said member having a plurality of air intake passages having inlet openings within the zone of air and outlet openings communicating with said intake control valves, resilient means normally urging said intake control valves with yielding pressure against their respective seats, a single fluid discharge control valve connected and concurrently movable with said member, and operating means actuable during the rotation of said member for progressively moving said member axially of the clutch to thereby control the flow of the independent fluids or of their relatively varied proportionate mixtures to thereby impart varied speeds and torques to a shaft driven by the clutch.

JOHN R. THOMAS.

References Cited in the file of this patent

UNITED STATES PATENTS

| Number | Name | Date |
|---|---|---|
| Re. 22,577 | Thomas | Dec. 12, 1944 |
| 956,860 | Lawler | May 3, 1910 |
| 1,014,501 | McCloud | Jan. 9, 1912 |
| 1,064,565 | Thurber | June 10, 1913 |
| 2,498,801 | Fraser | Feb. 28, 1950 |
| 2,526,914 | Thomas | Oct. 24, 1950 |
| 2,531,014 | Thomas | Nov. 21, 1950 |